Jan. 14, 1941.  L. M. PERSONS  2,228,533
CONTROL
Filed Dec. 3, 1937
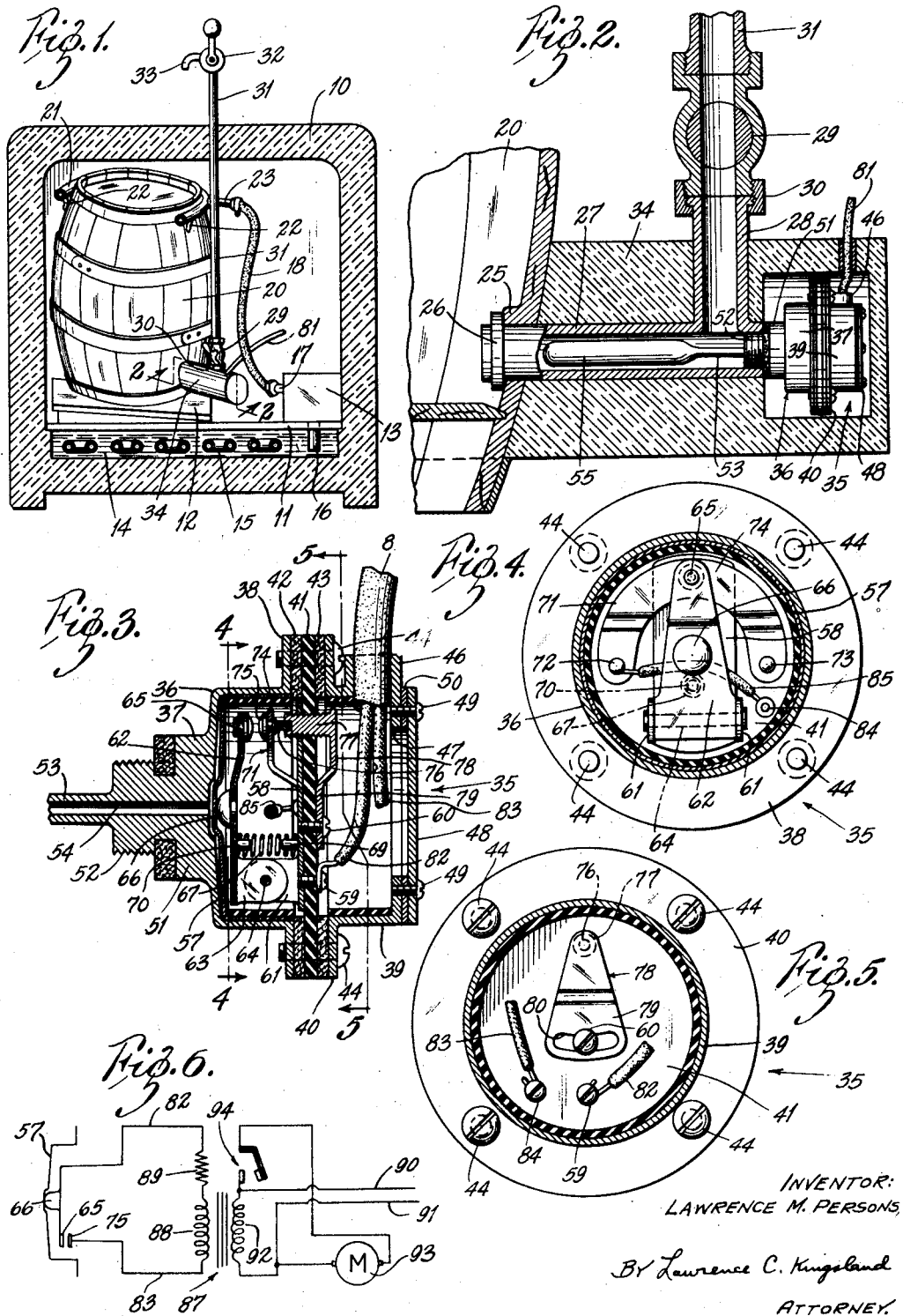
INVENTOR:
LAWRENCE M. PERSONS
BY Lawrence C. Kingsland
ATTORNEY.

Patented Jan. 14, 1941

2,228,533

UNITED STATES PATENT OFFICE 2,228,533

CONTROL

Lawrence M. Persons, St. Louis County, Mo., assignor to Automatic Control Corporation, St. Louis, Mo., a corporation of Delaware Application December 3, 1937, Serial No. 177,875

1 Claim. (Cl. 200—83)

The present invention relates generally to the combination of a liquid container and a control therefor, and is more particularly directed to the combination of a beverage container and a control therefor which accurately maintains the beverage within the container at a predetermined range of temperatures.

When beer, or the like, is cooled and maintained cooled for serving in a large container, as a keg, an automatic control is conventionally provided, which is ordinarily connected to the container and associated with the contained beer, or the like, through the bung hole. Necessarily, the control mechanism must be disposed externally of the container, or otherwise a separate control would have to be provided for each container, which, obviously, is impractical. Since the control elements are disposed externally of the container, they are subject to the influence of the temperature surrounding the same, even though they be heavily insulated.

Where the container and control are disposed within a refrigerating device comprising generally a box, a table or platform upon which the container and its control are disposed, cooling medium beneath the table, cooling coils within the cooling medium, and a pump for intermittently spraying the cooling medium over the container, the control is particularly affected by the temperature of the cooling medium, since the bung hole and, therefore, the connected control must be disposed at the bottom of the container in order to draw the full contents of the container. Hence, the control is disposed close to the cooling medium, which is maintained through the cooling coils at a relatively low temperature, such as 10°. The beer, on the other hand, should be maintained at from 40° to 50°. Due to the influence of the external temperature, the control elements and the fluid forming a part thereof will be at an intermediate temperature of around 25°.

It is obvious, therefore, that, should the control be set for operation to close the switch included therewith at 50° to bring the temperature of the beer back to 40°, the control will not function until the beer has reached a temperature considerably higher than 50°, in fact, somewhere around 65°. This is, of course, a most undesirable situation, since beer at a temperature of 55° or 60° is not a particularly excellent beverage.

Therefore, an object of the present invention is to provide a container and a control including means for compensating for the external temperatures surrounding the control elements.

Another object is to provide a container and a control which includes a thermally responsive element which compensates for subtemperatures of the atmosphere surrounding the control to effect accurate functioning of the switch.

Another object is to provide a container and a control which includes a bimetallic element forming one of the switch blades of the control which compensates for the temperature of the atmosphere surrounding the control and which permits the switch elements to engage in accurate response to a demand from a controlled medium.

Another object is to provide a container and a control which includes a simple, accurate, and efficient means for obtaining accurate response of the control to demands made upon it by the temperature of the medium being controlled.

Other objects and advantages will be apparent from the following description, taken in conjunction with the accompanying drawing, in which:

Fig. 1 is a vertical section through a cabinet or box disclosing therein a specific embodiment of the present invention, certain parts being broken away for clarity;

Fig. 2 is an enlarged vertical section on the line 2—2 of Fig. 1;

Fig. 3 is an enlarged vertical section through the control unit;

Fig. 4 is a section on the line 4—4 of Fig. 3;

Fig. 5 is a section on the line 5—5 of Fig. 3; and,

Fig. 6 is a wiring diagram of the circuits.

Referring to the drawing more particularly by reference numerals, 10 indicates a refrigerator cabinet or box of any preferred type. Within the cabinet 10 is a platform 11 which supports a table 12 and a pump and motor housing 13. Beneath the platform 11 is a cooling medium 14, such as brine, or the like, in which is disposed a sinuous cooling coil 15 which is connected to a suitable compressor, or the like (not shown).

It is, of course, to be understood that a pump and a motor are operatively connected within the housing 13. A pipe 16 extends from the pump into the cooling medium 14 and an exit pipe 17 extends from the pump above the cooling medium and is operatively connected to a flexible hose 18.

The table 12 is disposed with its supporting surface at an angle to the horizontal. Upon the supporting surface of the table 12 is a container 20 which is shown as a conventional beer keg. A circular pipe 21 having apertures in the lowermost disposed side thereof is disposed about the top of the container 20 and is spaced therefrom and is supported thereon by legs 22. A short pipe 23 is connected to the circular pipe 21 and to the flexible hose 18.

Disposed towards the bottom of the container 20 is a bung 25 which has operatively associated therewith the usual valve 26. An outlet pipe 27 of modified T configuration is shown (Fig. 2) as operatively engaging the valve 26. It is, of course, to be understood that the pipe 27 automatically opens the valve 26 when it is inserted into the valve 26 and turned home.

The pipe 27 includes a vertically disposed stem 28 to which is connected a manual control valve 29 by the usual coupling nut 30. A vertically disposed draw-off pipe 31 is threadedly connected to the valve 29 and has operatively associated with its free end a manual valve 32 and a spigot 33. Heavy insulation 34 surrounds the head of the pipe 27 and the major portion of the stem 28.

A control unit generally designated 35 is shown in detail in Fig. 3. A casing 36 for the control 35 includes a cup 37 having a peripheral flange 38, and a secondary cup 39 having a peripheral flange 40. The flanges 38 and 40 are disposed in opposed relation and are connected together with a disc 41 of insulative material and washers 42 and 43 therebetween by screws 44.

The cup 39 includes an apertured boss 46 extending outwardly from the annular wall thereof and an opening 47 in the bottom, which is closed by a plate 48 removably maintained in position by screws 49 and sealed against the bottom of the cup 39 by a washer 50.

The cup 37 has an enlarged portion 51 extending from the bottom thereof which includes a reduced externally threaded section 52 to which is connected centrally a tube 53. The enlarged portion 51 is centrally apertured at 54 to connect with the tube 53. The tube 53 terminates in an enlarged bulb 55 which contains an expansible fluid which is preferably a liquid, to secure a high fidelity movement of an associated diaphragm. A diaphragm 57 of circular cup configuration is fitted within and fixed to the cup 37 and is adapted to be actuated by the expansible fluid.

A plate 58 (Fig. 4) is connected to the insulative disc 41 by screws 59 and 60, the plate 58 being located on that side of the insulative disc 41 which is disposed towards the cup 37 (Fig. 3), whereas the heads of the securing screws 59 and 60 are disposed on the opposite side of the insulative disc 41. The plate 58 has opposed parallel projections 61 extending from the sides thereof adjacent one end.

A bimetallic blade 62 is pivotally connected through integral projections 63 to the projections 61 by a pin 64. The bimetallic blade 62 has a contact 65 fixed to the free end and a rivet head 66 fixed adjacent the ends thereof and disposed in abutting relation with the central portion of the diaphragm 57. A helical spring 67 is disposed between the plate 58 and the blade 62 to maintain the blade 62 in contact with the diaphragm 58 through the rivet 66, the spring 67 being maintained in operative disposition by studs 69 and 70 fixed to the plate 58 and to the blade 62, respectively.

An arcuate shaped member 71 is connected by rivets 72 and 73, or the like, to that face of the insulative disc 41 which supports the plate 58. A centrally disposed portion 74 of the member 71 is offset from the plane of the supporting surface of the insulative disc 41 and supports a contact 75 in operatively disposed position relative to the contact 65. The member 71 is of a resilient material and the offset portion 74 is maintained in engaging relation with a stop 76 of insulating material through this inherent resiliency of the member 71.

The insulative stop 76 is mounted in the end of a threaded extension 77 of an adjusting member 78, the extension 77 threadedly engaging an aperture in the plate 58. The member 78 includes a portion 79 having an arcuate slot 80 therein which is engaged by the screw 60 for maintaining the member 78 in predetermined adjusted relation.

A conduit 81 carries leads 82 and 83 through the boss 46 into the cup 39. The lead 82 is connected to the screw 59 as a terminal. The lead 83 is connected to a screw terminal 84 which extends through the insulative disc 41 (Figs. 4 and 5). A lead 85 is connected by one end to the extremity of the terminal screw 84 and by the other end to the rivet 72 as a terminal.

The control 35 is connected to the pipe 27 (Fig. 2) by means of the threaded segment 52, the bulb 55 being disposed within the pipe 27. The control 35 is heavily insulated.

In Fig. 6 there is shown diagrammatically a complete power set-up for the present invention. In order to prevent arcing of the contacts 65 and 75, the leads 82 and 83 are connected to the secondary 88 of a transformer 87. A heater 89 is connected to this circuit.

Main line leads 90 and 91 run to the primary 92 of the transformer 87 and across the pump motor 93, the latter circuit including in series a thermally actuatable switch 94. The switch 94 is adapted to be closed by heat from the heater 89.

It is apparent that the movement of the contact 65 into make relation with the contact 75 by the diaphragm 57 closes the circuit through the secondary 88 and causes the heater 89 to emit heat. The heat thrown off by the heater 89 closes the thermally actuatable switch 94, setting in motion the pump motor 93 which throws the cooling medium 14 over the container 20. The transformer is, of course, actively connected across the main line leads 90 and 91 at all times.

*Operation*

The functioning of the several elements for drawing beer, or the like, from the container 20 is simple and conventional. The insertion of the pipe 27 into operative connection with the valve 26 automatically opens the valve 26, the valve 29 being in closed position, and the control 35 being connected to the pipe 27 before it is inserted through the valve 26. After the pipe 31 is screwed into operative relation with the valve 29, the valve 29 is opened and beer, or the like, can be drawn from the container 20 through manipulation of the handle of the valve 32.

Assuming that all electrical connections have been properly made and the control set before installation to close the contacts 65 and 75 at a 50° temperature of the liquid in the container 20 and to open the contacts 65 and 75 at a 40° temperature of the liquid within the container 20, in ideal theoretical operation, when the temperature of the liquid within the container 20 rises to a temperature of 50°, the contacts 65 and 75 will be closed through the expansion of the fluid within the bulb 55 and related parts, the diaphragm moving to the right (Fig. 3) in moving the contact 65 into make relation with the contact 75. The closing of the contacts 65 and 75 sets in motion the pump motor which actuates the pump to convey cooling medium from the floor of the cabinet 10 through the pipe 16, the pump itself, the pipe 17, the flexible hose 18, the pipe 23, and into the circular pipe 21 from which it passes through the holes therein to flow down the sides of the container 20, thereby cooling the beverage contained therein. This operation continues until the temperature of the beverage within the container 20 drops to 40°, at which temperature the fluid within the bulb 55 and associated parts will have contracted sufficiently to permit the contact 65 to move from engaging relation with the contact 75.

However, actual working conditions do not permit this ideal operation of the apparatus. The control 35 is necessarily disposed relatively close to the cooling medium 14, which is maintained at a temperature of around 10°, and, even though the control 35 is heavily insulated, it is unduly affected by this surrounding necessarily relatively cooler atmosphere. Therefore, when the temperature of the beverage within the container 20 is 40°, the temperature of the thermally responsive elements of the control 35 will be some intermediate temperature, as 25°.

Hence, after installation of the cooling unit in the box 10 and after the cooling medium 14 has been reduced to its low temperature of 10°, as the temperature of the fluid within the bulb and related elements of the control 35 drops to around 25° while the temperature of the beverage within the container 20 is dropping to 40°, movement of the diaphragm 57 to the left (Fig. 3) results due to the additional contraction of the fluid within the bulb 55 and its related elements which permits movement to the left of the bimetallic blade 62. The contact 65, however, is maintained in its preselected position relative to the contact 75 during this undesirable movement of the diaphragm 57 to the left, for the lowering of the temperature within the cup 37 causes the bimetallic blade 62 to bend to the right at its contact carrying end as its main body portion follows the diaphragm 57 to the left through the action of the spring 67.

Therefore, when the temperature of the beverage within the container 20 rises to 50°, the corresponding 10° rise in temperature of the bulb 55 will effect a closing of the contacts 65 and 75 as the beverage reaches the temperature of 50°.

It is thus clear that the control will operate to maintain the beer between a selected range of temperatures, even though the control is influenced by temperatures external to the beverage container.

It is to be understood, of course, that any fluid is susceptible of being maintained at a selected range of temperatures by the present invention. The present invention is particularly adapted to maintain beverages cool where the beverage is confined in a container and it is desired that the temperature of the beverage be higher than the temperature of the adjacent cooling medium and where it is impractical to incorporate the control within the interior of the beverage container. The specific temperatures set forth are illustrative.

It is to be understood that the foregoing description and accompanying drawing have been given by way of illustration and example, and not for purposes of limitation, the invention being limited only by the claim which follows.

What is claimed is:

A control for operative connection to a liquid container having a draw pipe adapted to set in motion means to change the temperature of liquid within the container, said control comprising a casing disposed exteriorly of the container, a solid-charge thermostat including a diaphragm within the casing having a bulb extending into the liquid within the draw pipe of the container, a thermally sensitive lever pivotally mounted within the casing, a member fixed to said lever intermediate the ends thereof, said member being in engagement with the central portion of the diaphragm, a spring continuously forcing said lever in one direction of movement maintaining said member in engagement with the diaphragm, a contact fixed to the free end of the lever, and a fixed contact within the casing adapted to be engaged by the first contact, said lever being of bimetal construction and adapted to compensate for ambient temperatures affecting the fluid within the thermostat to insure accurate operation of the control at the demand of the liquid within the container.

LAWRENCE M. PERSONS.